Oct. 8, 1940.  G. FLOWER  2,217,249
FASTENER
Filed March 25, 1940
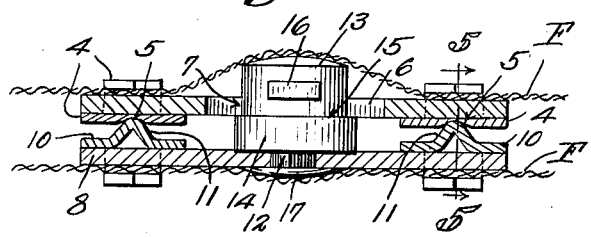
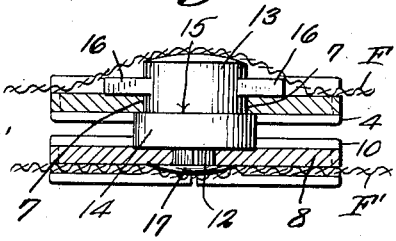
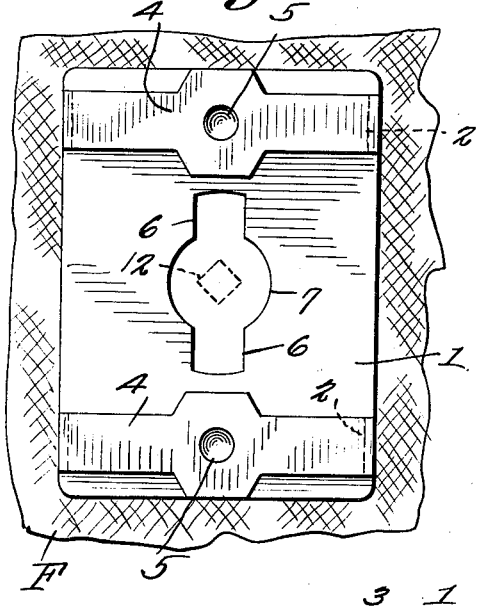
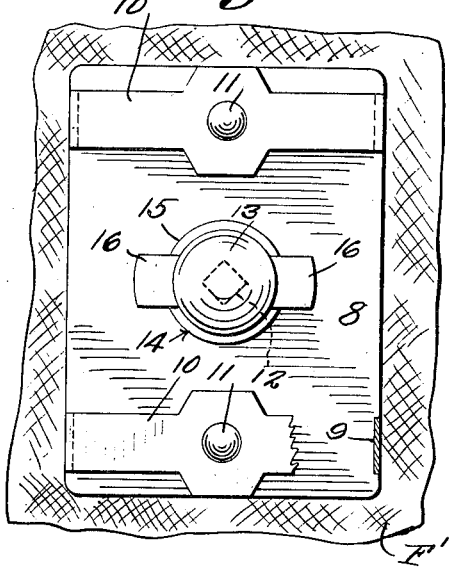
George Flower
INVENTOR.
BY *CH Knowles*
ATTORNEYS.

Patented Oct. 8, 1940

2,217,249

UNITED STATES PATENT OFFICE 2,217,249

FASTENER

George Flower, Sparrows Point, Md.

Application March 25, 1940, Serial No. 325,904

2 Claims. (Cl. 24—221)

This invention relates to a fastener which can be used for holding together detachably the overlying portions of pieces of fabric, it being possible to make the fastener on a small scale for application to garments and, on a larger scale, for application to tent flies, etc.

An object of the invention is to provide a fastener made up of separate members so constructed that when one is given a partial rotation relative to the other after the two have been put in interfitting relation, the said members will be held securely against separation.

A further object is to utilize fastening members adapted to be held to fabrics or the like by means of staples, the said staples including means adapted to cooperate to hold the members of the fastener against accidental separation after they have been brought into securing position.

A still further object is to provide a fastener which can be attached readily to fabrics or the like and which, when in use, will be substantially concealed so that it cannot become caught on objects, thereby rendering the fastener especially adaptable for use on work clothing.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing—

Figure 1 is a central longitudinal section through the inner engaging members of the fastener, said section being taken lengthwise of the fastener and the central or stud portion being shown in elevation.

Figure 2 is a similar view taken transversely of the fastener at the center thereof.

Figure 3 is a face view of one of the members of the fastener applied to a fabric.

Figure 4 is a face view of the other member of the fastener applied to a fabric, a portion of one of the attaching staples being broken away.

Figure 5 is a section on line 5—5, Figure 1.

Referring to the figures by characters of reference, 1 designates a plate provided in opposite edges adjacent to the respective ends with recesses 2 and these recesses are proportioned to receive the flat legs 3 of a metal staple 4 which rests flat upon and extends transversely of the plate 1 and has a central enlarged portion in which is formed a recess or depression 5. Formed in plate 1 between these recessed central portions of the staples is a longitudinal slot 6 the central portion of each side wall of which is recessed as at 7 so that the slot 6 thus is formed with a rounded central portion.

The other member of the fastener includes a plate 8 likewise provided in opposite sides adjacent its ends with recesses 9 for the reception of flat metal staples 10. These staples rest flat upon the plate and their pointed legs are extended through the recesses 9. The intermediate portions of the staples are enlarged and carry small nodes 11.

Fitted in the central portion of plate 8 is an angular lug 12 extending from a stud 13 which is circular in cross section. This stud is of a diameter slightly less than that of the enlarged central portion 7 of slot 6 and the stud has an enlarged base 14 providing an annular shoulder 15. The diameter of this base is somewhat greater than the diameter of the central enlarged portion 7 of slot 6.

Extending in opposite directions from the stud 13 are ears 16, the width of each ear being slightly less than the width of the end portions of slot 6.

Lug 12 is held in the plate 8 by upsetting the end thereof as shown at 17.

Two pieces of fabric to be joined by the fastener have been indicated at F and F'. The members of the fastener are adapted to be placed between lapping portions of the two pieces of fabric and to be so located that the stud 13 can be inserted into the opening in the plate 1. First the two plates are attached to their respective pieces of fabric by means of the staples, the legs of the staples being forced through the fabrics and clinched as shown in Figures 1, 2 and 5. After the fasteners have been attached to the adjoining or concealed faces of the lapping fabrics as shown, it is necessary, in order to join the fastener members, to impart a one quarter rotation to one or the other of the fastener members until the ears 16 can be brought opposite the ends of slot 6. The ears are then pressed through the slot with stud 13 extending into the enlarged central portion 7 of the slot. When plate 1 is brought against the shoulder 15, the two plates are restored to their normal positions with the ears 16 parallel with the staples 4 and their ends projecting in opposite directions back of plate 1 and at right angles to slot 6. Thus the two plates are held together securely. In turning the plates into this position the nodes 11 will ride onto the staples 4 and snap into the sockets 5 as shown in Figures 1 and 5, thereby holding the two plates against accidental rotation relative to each other while they are in holding position.

As the members of the fastener are located between the fabrics, it will be apparent that when they are in use, these fastener members will be substantially concealed, the only part visible being the ends of the staples.

What is claimed is:

1. A fastener including a plate having a slot extending towards the ends thereof provided with a central enlargement, a second plate, a stud thereon positioned for insertion into and rotation within the central slot enlargement, oppositely extending ears on the stud positioned for insertion through the ends of the slot, said ears being extended towards the sides of the plate, and said stud and its plate being rotatable to position the ears in lapped relation with the slotted plate when inserted therethrough, and staples straddling the ends of the plates for insertion into fabrics to be held together by the fastener, there being recesses in opposed edges of the plates for the reception of the legs of the staples, and cooperating means on the staples for holding the plates against accidental relative rotation while held together.

2. A fastener including a plate having a slot extending towards the ends thereof provided with a central enlargement, a second plate, a stud thereon positioned for insertion into and rotation within the central slot enlargement, oppositely extending ears on the stud positioned for insertion through the ends of the slot, said ears being extended towards the sides of the plate, and said stud and its plate being rotatable to position the ears in lapped relation with the slotted plate when inserted therethrough, and staples straddling the ends of the plates for insertion into fabrics to be held together by the fastener, there being recesses in opposed edges of the plates for the reception of the legs of the staples, and cooperating means on the staples for holding the plates against accidental relative rotation while held together, said means including nodes on the staples of one plate, there being recesses in the staples of the other plate constituting seats for the nodes.

GEORGE FLOWER.